United States Patent Office 2,915,258
Patented Dec. 1, 1959

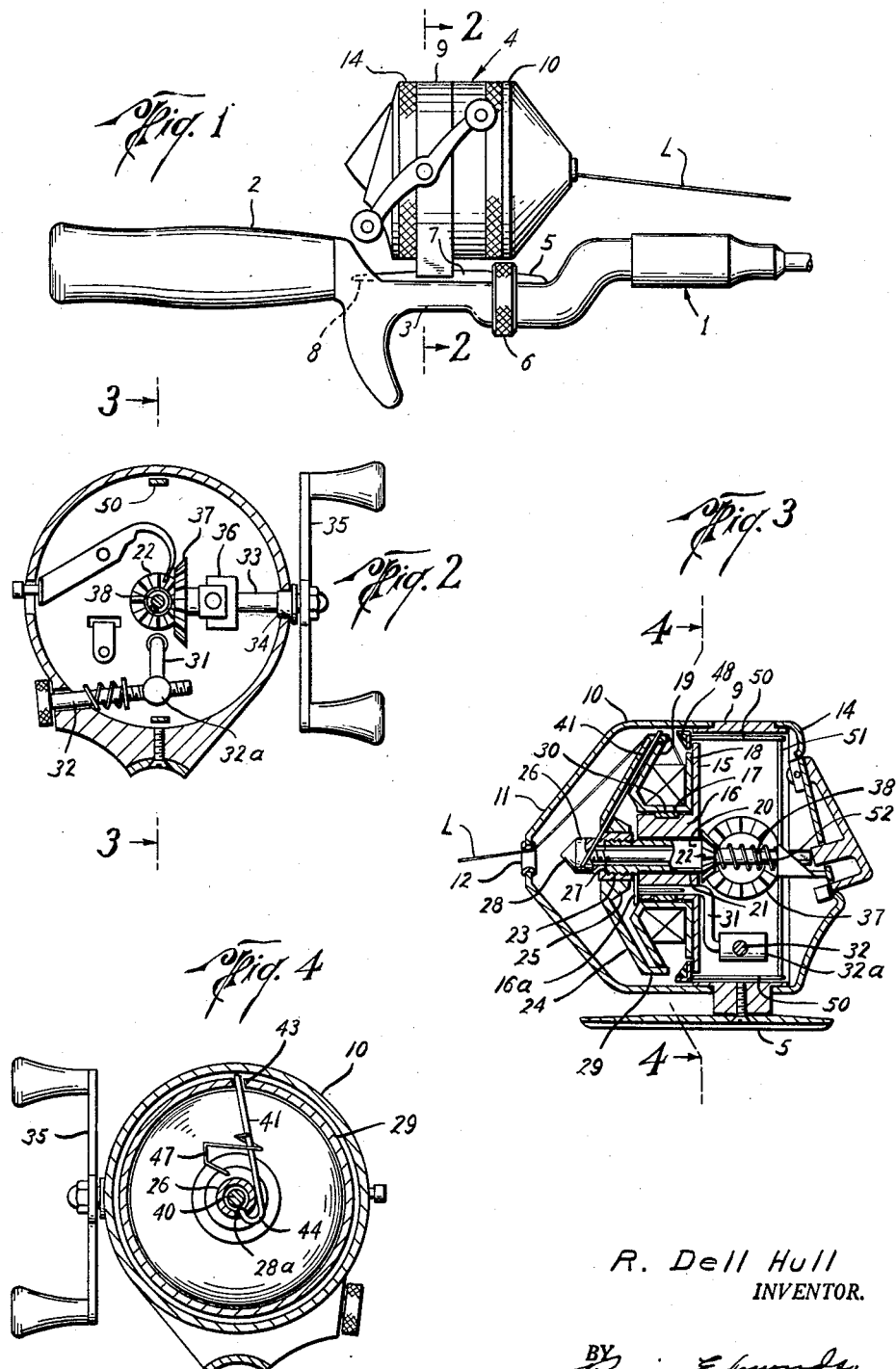
Dec. 1, 1959 — R. D. HULL — 2,915,258
SPINNING TYPE FISHING REEL
Filed Oct. 4, 1954 — 2 Sheets-Sheet 1
R. Dell Hull
INVENTOR.
ATTORNEY

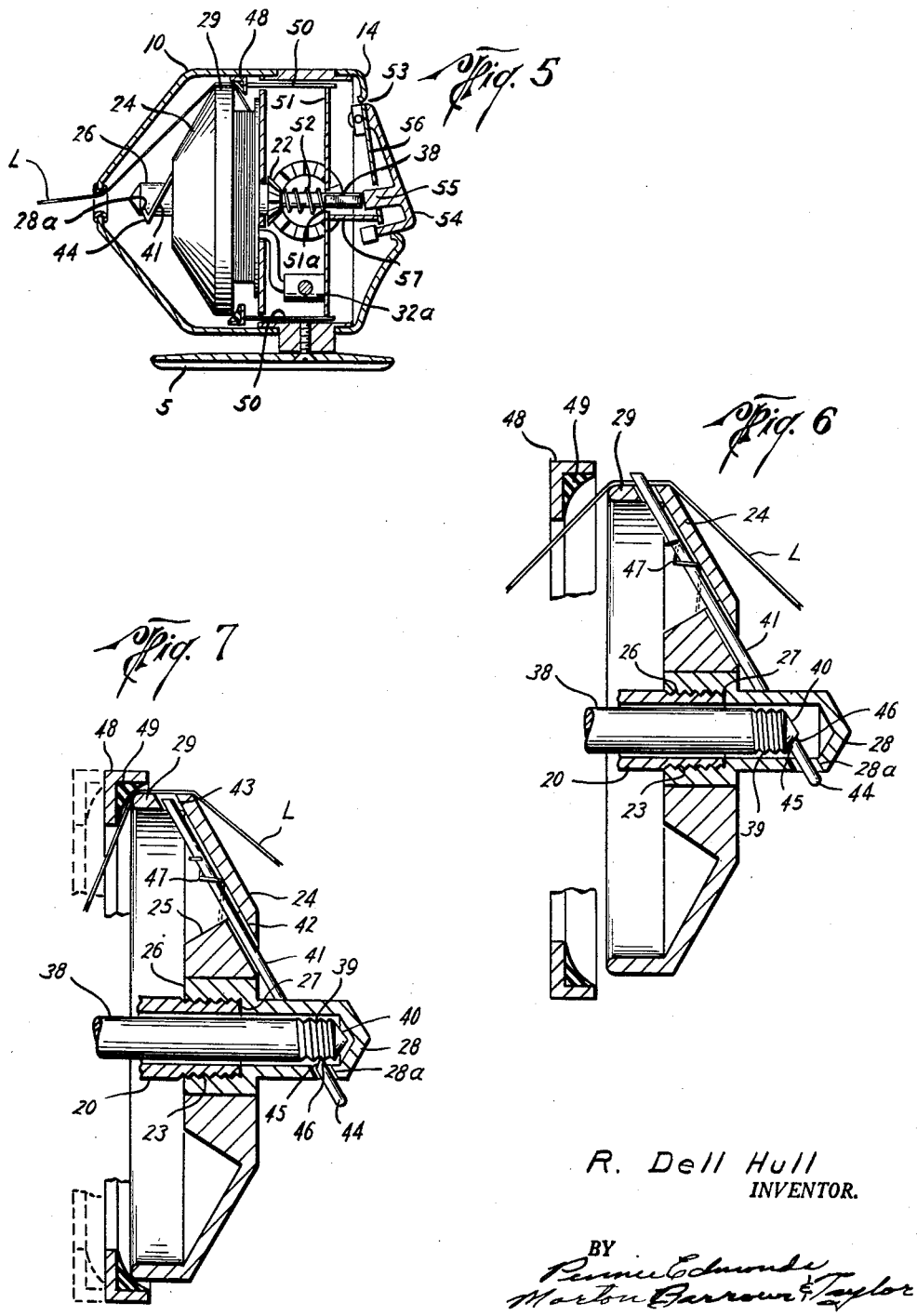

2,915,258

SPINNING TYPE FISHING REEL

R. Dell Hull, Tulsa, Okla.

Application October 4, 1954, Serial No. 459,943

7 Claims. (Cl. 242—84.2)

This invention relates to fishing reels and more particularly to devices of the so-called "spinning-reel" type.

In such devices, the spool on which the line is wound normally remains stationary during casting and re-winding. In casting, the weight of the lure is employed to draw the line off over the end of the spool in a spinning motion, while re-winding is ordinarily accomplished by means of a rotatable finger or pick-up member which guides the line back on the spool. The present invention is directed to improvements of various features of construction in devices of this general character, and more particularly in the spinning-type reel of the kind disclosed in my U.S. Patent No. 2,675,192.

Among the features of construction constituting the present invention are improvements in the line-braking mechanism and actuating elements therefor; in the mechanism for advancing and retracting the line pick-up finger; in the slipping clutch mechanism for the line spool, and in the combinations of these several elements with the other elements of the reel. Certain features of the invention, relating to improvements in the line-braking mechanism, are disclosed in my co-pending application, Serial No. 266,915, filed January 17, 1952, for "Fishing Reel," now abandoned, and, as to these features, the benefit of the earlier filing date of the abandoned application is claimed.

By virtue of the improved construction, reels constructed in accordance with the present invention are much more efficient and much faster and smoother in operation, have less drag, thereby enabling the casting of comparatively light lures for long distances and with a maximum degree of control of the line during casting and re-winding.

Additional advantages of the construction in accordance with the present invention are that minimum adjustments are necessary, the reel fits any conventional fishing rod, and handles and is operated by ordinary movements employed in operating more conventional types of fishing reels. In particular, although the reel in accordance with the present invention is a true spinning reel, the construction permits its operation and handling in a manner substantially identical with conventional casting reels. Moreover, the danger of back-lash is completely eliminated and relatively long, effortless casts, particularly of light lures, as noted, may be obtained.

Other and more specific objects and advantages of the present invention will become readily apparent from the following detailed description when read in conjunction with the accompanying drawing which illustrates one useful embodiment in accordance with this invention.

In the drawing:

Fig. 1 is an elevational view of the reel in position on a fishing rod;

Fig. 2 is a transverse vertical cross-sectional view on line 2—2 of Fig. 1;

Fig. 3 is a longitudinal sectional view on line 3—3 of Fig. 2, showing the parts in positions occupied during re-winding;

Fig. 4 is a generally transverse cross-sectional view taken on line 4—4 of Fig. 3;

Fig. 5 is a view generally similar to Fig. 3, showing the parts in the positions occupied while braking the line;

Fig. 6 is an enlarged fragmentary view, showing in greater detail the pick-up head including the portions of the device employed in advancing and retracting the line pick-up finger, the parts being shown in the pick-up position corresponding to the position shown in Fig. 3; and Fig. 7 is a view similar to Fig. 6, showing the line pick-up finger in retracted position and the brake element engaging the line.

Referring to the drawing: The reference numeral 1 designates generally a fishing rod of any desired and generally conventional construction. This rod is provided with a handle portion 2 and is further provided with a reel-receiving portion 3 which is flattened on its upper side. The reel, designated generally by the numeral 4, is mounted on a supporting plate 5 and is adapted to be secured to the reel-receiving portion of the handle, as shown. A securing ring 6 is arranged on the reel-receiving portion of the rod and is adapted to slide over one end of plate 5 which is upwardly tapered, as at 7, to wedgingly clamp the plate to the reel-receiving portion. In the construction shown, where the reel-receiving portion of the rod merges with the handle portion, there is provided a slot 8 for the reception of the rearward end of supporting plate 5.

Reel 4 comprises a tubular casing 9 formed of any suitable material, such as metal, rigid plastic, or the like, and is provided with a front cover 10 which fits snugly over the forward end of casing 9 and may be removed when desired. The forward portion of cover 10 is formed with a forwardly tapered conical portion 11 provided at its apex with a line guide opening 12. A rear cover 14 fits snugly over the rear of casing 9 and may be removed when desired. A wall 15 extends across the forward end of casing 9 and has formed in the center thereof a forwardly projecting tubular boss 16 having a bore 21. A line spool 17 is mounted on boss 16 forwardly of wall 15 and is arranged for controlled rotation about boss 16, as will be more fully described hereinafter. A pivoted keeper 16a serves to releasably lock the spool on boss 16.

A slipping clutch or drag brake mechanism is arranged between the outer periphery of hub 16 and the inner wall of spool 17 and comprises a resilient metal band 30 positioned between these surfaces having its ends suitably secured to a rock shaft 31. The swinging movements of the latter operates to expand and contract brake band 30 with respect to the inner wall of spool 17 to thereby control the braking force exerted on the spool to resist its rotation about hub 16. An adjustment rod 32 extends through the wall of casing 9 and is threadedly inserted through a crank 32a which is drivingly connected to rock shaft 31 for adjusting the braking pressure exerted by band 30. This type of braking mechanism is described in greater detail in my co-pending application Serial No. 363,578, filed June 23, 1953, now abandoned in favor of my continuation-in-part application Ser. No. 615,708, filed October 12, 1956.

Line spool 17 is provided with a rear or inner end flange 18 which seats against the forward face of wall 15 and has a circular front flange 19 axially spaced from rear flange 18 and tapering slightly inwardly or rearwardly toward the latter, having the forwardly projecting, generally conic form, as shown. A tubular shaft 20 extends axially through bore 21 and is rotatable therein and carries on its inner end a pinion 22 which is fixedly secured on the shaft and bears against the inner face of wall 15. The forward or outer end of shaft 20 extends in front of the forward end of spool 17 and is provided with external threads 23 adapted to threadedly receive a circular pick-up head 24 of rearwardly tapering generally conical shape to thereby parallel forward flange 19. Pick-up head 24 is formed with a thickened central hub 25 having mounted in the bore thereof a ferrule or tubular sleeve 26 which is internally threaded for engagement with threads 23. An internal shoulder 27 is provided in the bore of sleeve 26 and is adapted to abut against the end of shaft 20 when head 24 is screwed thereon, whereby to provide appreciable clearance space between the inner surface of head 24 and the forward face of flange 19.

The forward end of sleeve 26 projects somewhat in front of head 24 and the outer end of the sleeve is closed by means of an end-wall 28. An opening 28a is provided in the underside of sleeve 26 between head 24 and end-wall 28. The outer periphery of head 24 is formed with a rearwardly extending annular flange 29 which projects over, and is closely adjacent, the outer periphery of spool flange 19.

A crank shaft 33 is mounted in casing 9 at right angles to its longitudinal axis and projects radially through the wall of the casing through a bearing 34 and has mounted on its outer end a winding handle 35. The inner portion of crank shaft 33 is journalled in a support bearing 36 which is attached to wall 15. Crank shaft 33 carries on its inner end a pinion 37 which is in mesh with pinion 22 whereby rotation of crank shaft 33 will rotate shaft 20 and head 24. A cylindrical actuating rod 38 extends slidably through the bore of shaft 20 and through the center of pinion 22 and projects rearwardly therefrom. The forward end of rod 38 extends into the bore of sleeve 26, as best seen in Figs. 6 and 7, and is provided on its forward portion just back of its forward end with a short section of threads 39 of relatively coarse tapered form. The forward end of rod 38 is shaped to form a forwardly projecting conical surface 40. A pin 41 is mounted for radial sliding movement on the inner face of head 24 extending through a passage 42 in hub 25 and having its outer end in registration with an opening 43 in flange 29. The inner end of pin 41 is bent upon itself to form a hook-shaped portion (see Fig. 4 particularly) having a bill portion 44 which extends through opening 28a into the interior of shaft 20 for engagement with the threaded end of rod 38. The end of bill portion 44 is cut at an angle to the longitudinal axis of the pin to form a cam surface 45 having a slope or taper which is generally complementary to the slope of surface 40. Cam surface 45, by reason of its sloping form, provides a relatively sharp point 46 at its upper edge. The function of surfaces 40 and 45 and of point 46 and threads 39 will be described more fully hereinafter. A coil spring 47 has one end secured to pin 41 and the other to head 24 so as to normally urge pin 41 outwardly through opening 43.

Longitudinal movement of rod 38 and rotary movement of head 24 are employed to actuate pick-up pin 41 in the following manner: With rod 38 retracted to the position shown particularly in Figs. 3, 4 and 6, pin 41 will be thrust radially outwardly through opening 43 under the urging of spring 47 and will be in position to engage line L for re-winding. In this position it will be seen that surface 45 on bill portion 44 will be engaged by conical surface 40 on the forward end of rod 38. In order to retract pin 41, rod 38 will be moved forwardly whereby the relative tapers of surfaces 40 and 45 will co-act to pull pin 41 inwardly against the resistance of spring 47 and the forward movement of rod 38 will then advance the threads 39 past the bill portion of the pin, as best seen in Fig. 7, by a ratcheting action, due to the yieldable mounting of pin 41. Point 46, on the end of the bill portion, will thus function as a pawl and will be engaged in the threads 39, as shown. This will serve to hold the pick-up pin in the retracted position, allowing line L to move freely across flange 29 and the edge of the pick-up head, as during casting. When it is desired to again project the pick-up pin to engage the line for re-winding, head 24 will be rotated by means of handle 35 in the re-winding direction. This will rotate the head and pin 41 around rod 38 and will act to unscrew bill portion 44 from its engagement with threads 39 and thereby urge rod 38 relatively rearwardly of the bill portion in response to this unthreading movement until bill portion 44 has been completely released from its engagement with rod 38, whereupon spring 47 will project the pin outwardly to the position shown in Fig. 6.

The reel includes a brake mechanism of the general type disclosed in the aforementioned Patent No. 2,675,192 and includes a ring-shaped brake member 48 mounted in front of wall 15 and provided with a lining 49 composed of any suitable friction-creating material, such as rubber, plastic, or other composition material. Brake member 48 is radially and annularly dimensioned so that when moved forwardly it will annularly engage the inner edge of flange 29 and thereby clamp or brake the movements of line L passing to and from spool 17. A pair of diametrically spaced brake rods 50—50 are secured to brake member 48 and project rearwardly through suitable openings in wall 15 and have their rearward ends secured to a brake lever 51 in the form of a yoke member, which extends diametrically of casing 9. The center of brake lever 51 is provided with a rectangular opening 51a (Fig. 5) through which a flattened portion of rod 38 extends slidably rearwardly of lever 51 to hold rod 38 against rotation. A coil spring 52 is mounted about rod 38 in compression between pinion 22 and brake lever 51, urging the latter and its connected brake member 48 rearwardly and, therefore, out of braking engagement with flange 29.

Rear cover 14 has an opening 53 therein in which is mounted a thumb pressure plate 54 which is swingably connected at its upper end to cover 14, so that it will swing freely through the cover. Pressure plate 54 is provided near its lower end with an inwardly projecting boss 55 positioned to register with the rearward end of rod 38 so that as the pressure plate is urged forwardly it will urge rod 38 in the forward direction. A leaf spring 56, or other resilient element, is mounted inwardly of pressure plate 54 and has a portion extending below boss 55 positioned to resiliently engage a rearwardly extending lug 57 mounted on brake lever 51.

The above-described reel operates in the following manner: It will be assumed that a re-winding operation has just been completed. At this stage the parts of the reel will be in the positions shown in Figs. 3, 4 and 6, in which it will be noted that bill portion 44 of the pick-up pin is riding on end-surface 40 of rod 38 and that the outer end of pin 41 is projecting through flange 29 into engagement with line L, and that brake member 48 and pressure plate 54 are in their rearwardly retracted positions under the urging of spring 52.

To prepare the reel for casting, the operator presses forwardly on pressure plate 54. This forward movement of the pressure plate urges brake member 48 against the inner edge of flange 29 and clamps line L between the flange and the brake member, thereby temporarily preventing the line from feeding off of the spool. The inward movement of the pressure plate will simultaneously cause boss 55 to urge rod 38 forwardly and thereby retract pin 41, as previously described, and cause bill portion 44 to engage in threads 39, thereby locking the pick-up pin in a position out of further engagement with line L. The brake member and pick-up pin will thereupon occupy the positions shown best in Figs. 5 and 7. As the cast is made, the thumb pressure will be relieved from pressure plate 54, allowing the brake member to retract to the position shown in Fig. 6, and in broken lines in Fig. 7, thereby releasing line L which will unwind from spool 17 in response to the outward flight of the lure attached to the line. Head 24 will remain stationary while the line is feeding out and the length of cast and the movement of the line from the spool may be controlled by "thumbing" pressure plate 54 to thereby brake the line between flange 29 and brake member 48, as desired, the movements being closely similar to the movements employed in controlling the cast from a more conventional casting reel.

When it is desired to rewind the line, pressure plate 54 will be allowed to return to its normally retracted position and the operator simply begins turning handle 35 to rotate shaft 20 and head 24 in the rewinding direction. This rotation of head 24, as previously described, causes bill portion 44 to be rotated out of threads 39, this unthreading movement urging rod 38 rearwardly until the bill portion has cleared the threads and then under the urging of spring 47 will slip back over surface 40, projecting the outer end of pin 41 through opening 43 and into engagement with line L. Thereafter, continued rotation of the handle will rotate head 24 and the projecting pin 41 and the engagement of the latter with line L will wind the line on spool 17 as the disk rotates. The rotation of the handle will be continued until the line is re-wound to the desired extent, at which instant the parts of the reel will again be in positions illustrated in Figs. 3, 4 and 6 and ready to begin another series of operations, as previously described.

The number and the pitch of threads 39 may be varied widely and will ordinarily be such that minimum angular rotation of head 24 will be required in order to release pick-up pin 41 and project it through opening 43.

The slipping clutch elements will be adjusted in the well-known manner in order to exert enough pressure on spool 17 to hold it stationary during casting and while playing a fish and to allow the reel to slip about boss 16 when a pull on the line by a fish approaches the breaking strength of the line.

It will be apparent from the foregoing description that I have provided a device of the "spinning reel" type which has many advantages over such prior devices. While I have shown and described a preferred form of the invention, it is, of course, understood that modifications therein, within the scope of the appended claims, may be made without departing from the spirit of the invention.

I claim:

1. In a spinning-type fishing reel the combination of a tubular casing, a line-carrying spool mounted in the casing, a hollow drive shaft extending through the casing and the spool, a pick-up head mounted on the drive shaft in front of the spool for rotation by the drive shaft, a line pick-up pin movably supported by the pick-up head for projection of an end thereof beyond the outer periphery of the head to engage a line extending from the spool forwardly over the front thereof and over the head, means normally urging said pin to its projected position, and an axially freely movable pin controlling rod extending through the hollow drive shaft and beyond the forward end thereof and operatively engageable with the other end of said pick-up pin to move it to retracted position.

2. In a spinning type fishing reel the combination of a tubular casing, a line-carrying spool mounted in the casing, a hollow drive shaft extending through the casing and the spool, a pick-up head mounted on the drive shaft in front of the spool for rotation by the drive shaft, a line pick-up pin movably supported by the pick-up head for rotation thereby, said line pick-up pin extending substantially tangentially of said drive shaft and having its inner end beveled, means normally urging said pick-up pin to a position in which its outer end projects beyond the outer edge of the pick-up head, a pin controlling rod extending through the hollow drive shaft and beyond the forward end thereof and having a cam surface at its forward end to engage said beveled inner end of the pick-up pin when the rod and pick-up pin are moved relatively in a direction axially of the former and move the pin to a position in which its outer end is retracted inwardly of the outer edge of the head, and means for relatively moving said pin controlling rod and said pick-up pin toward each other for engagement.

3. In a spinning type fishing reel, the combination set forth in claim 2 in which the forward end of the pin controlling rod is tapered at substantially the same angle as is the inner end of the pin to urge the inner end of the pin, when the rod and pin are moved relatively toward one another axially of the former, up onto the cylindrical surface of the rod, and in which the cylindrical surface portion of the pin controlling rod adjacent its tapered end is provided with a spiral groove into which the inner end of the pick-up pin extends when moved to the surface of the rod.

4. In a spinning-type fishing reel the combination set forth in claim 3 in which the pin controlling rod is nonrotatable, and the inner end portion of the line pick-up pin is hook shaped, the beveled end thereof being adapted to engage the pin controlling rod on the side thereof substantially opposite that on which the outer end of the pin lies.

5. In a spinning-type fishing reel the combination set forth in claim 4 in which the line pick-up head has a hub which is threadedly mounted on the end of said hollow drive shaft and has a forward chamber into which the pin controlling rod extends axially, and through the wall of which the hook portion of the pin extends to be engaged by said rod.

6. In a spinning reel of the type having a frame, a line spool carried by said frame, a pick-up member carried by said frame forwardly of said line spool, an actuating rod carried by said frame in coaxial relation to said line spool and movable axially to render said pick-up member effective, an annular brake member disposed about said line spool and adapted for axial movement into braking engagement with a line extending outwardly from said spool, and casing means surrounding said spool, pick-up member, brake member and rod and having a back wall; the improvement comprising a pair of brake rods engaging said annular brake member at diametrically opposed points and slidably received in said frame, said brake rods having portions projecting rearwardly of a wall of said frame, a yoke member disposed between said frame wall and the back wall of said casing means and engaging the projecting portions of said brake rods at its opposite ends, the central portion of said yoke member intersecting the axis of said actuating rod, and a pressure member pivoted on the back wall of said casing means and exposed exteriorly thereof for manual engagement and having portions projecting into the space between the walls of said frame and casing means, the projecting portions of said pressure member being adapted upon inward movement thereof to move said yoke member and actuating rod forwardly.

7. The spinning reel of claim 6, characterized by said pressure member being adapted upon initial inward movement thereof to effect the forward movement of said yoke member for a predetermined distance, and upon further inward movement to effect the forward movement of said yoke member and actuating rod.

References Cited in the file of this patent
UNITED STATES PATENTS

| | | |
|---|---|---|
| 2,492,587 | Ledingham | Dec. 27, 1949 |
| 2,521,543 | Shakespeare et al. | Sept. 5, 1950 |
| 2,630,979 | Uerling | Mar. 10, 1953 |
| 2,652,990 | Ferguson | Sept. 22, 1953 |
| 2,668,025 | Hull | Feb. 2, 1954 |